3,004,911
CATALYTIC CRACKING PROCESS AND TWO UNIT SYSTEM
James W. Slover, Phillips, Tex., assignor to Phillips Petroleum Company, a corporation of Delaware
Filed Dec. 11, 1959, Ser. No. 858,943
10 Claims. (Cl. 208—78)

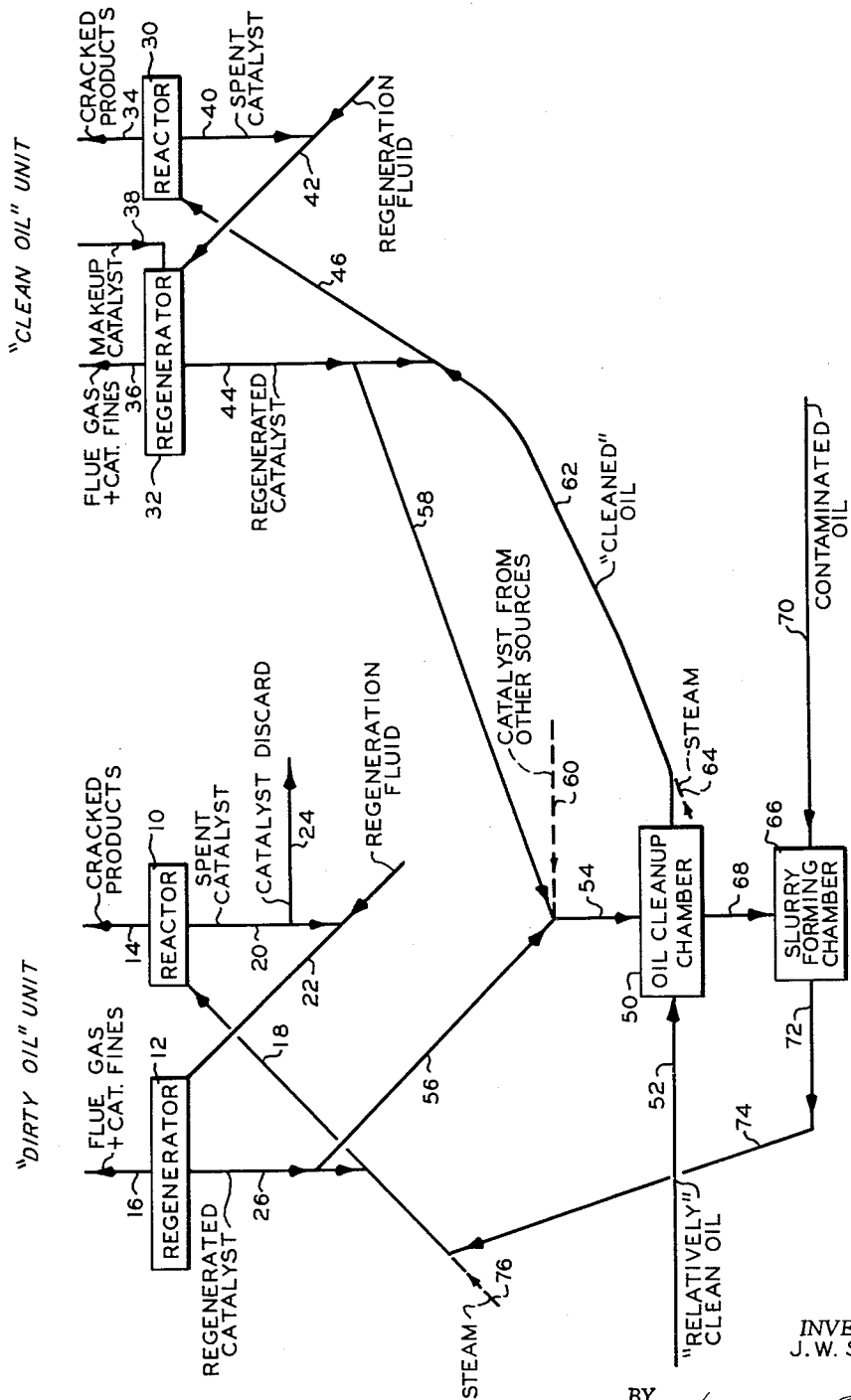

This invention relates to an improved process and arrangement of apparatus for separately catalytically cracking two different hydrocarbon feed stocks of substantially different metal contaminant concentration.

It is conventional practice in petroleum refineries to fractionate crude oil to obtain a gaseous fraction, a gasoline fraction, a kerosene or distillate fraction, and a virgin gas oil fraction, leaving a bottoms fraction comprising topped crude. The virgin gas oil fraction has a smaller concentration of metal contaminants than the original crude but it does contain a minor concentration of metals such as nickel, vanadium, iron and other less troublesome metals which are usually deposited on the cracking catalyst in a subsequent cracking operation to produce gasoline. The major portion of the contaminating metals are left in the topped crude which is also subsequently subjected to catalytic cracking to produce gasoline. This invention is concerned with an improved process and arrangement of apparatus for separately catalytically cracking separate streams of a "cleaner" oil, such as gas oil, and a "dirtier" oil, such as topped crude, in separate catalytic cracking units which produces more gasoline per pound of catalyst and makes greater utility of the catalyst.

Accordingly, it is an object of the invention to provide an improved process and arrangement of apparatus for catalytically cracking two hydrocarbon feed stocks in separate reactors, one of said feeds containing an appreciable concentration of metal contaminants deleterious to cracking, the other feed containing substantially less of the contaminants. Another object is to improve the gasoline yield and decrease the coke and gas formation in cracking a relatively clean oil, such as a gas oil. A further object is to provide better use of a cracking catalyst when simultaneously cracking a topped crude and a gas oil in separate reactors to produce gasoline. Other objects of the invention will become apparent upon consideration of the accompanying disclosure.

A broad aspect of the invention comprises passing separate hydrocarbon streams containing different amounts of metal contaminants (designated a "cleaner" oil and a "dirtier" oil) to separate reactors in contact with a suitable cracking catalyst, circulating spent catalyst from each reactor to a separate regenerator and regenerated catalyst back to its respective reactor, passing regenerated catalyst from the regenerator for catalyst from the "dirtier" hydrocarbon feed to a contacting chamber for the "cleaner" hydrocarbon feed maintained below cracking temperature, passing the "cleaner" feed through this contacting chamber before passing the same to its respective reactor, and returning the catalyst from the contacting chamber to the reactor for the "dirtier" feed in admixture therewith. Spent catalyst is also passed from the regenerator for the catalyst used in contacting the "cleaner" feed to the contacting chamber to assist in cleaning up the "cleaner" feed. The catalyst is removed from the contacting chamber and is mixed with the "dirtier" hydrocarbon feed to form a slurry therewith before passing the slurry to the reactor for "dirtier" feed in admixture with regenerated catalyst.

The invention may be more clearly understood from a consideration of the accompanying schematic drawing which is a flow diagram illustrating a preferred flow and arrangement of apparatus.

Referring to the drawing, a first catalytic cracking unit comprises a reactor 10 and a regenerator 12. An effluent line 14 from reactor 10 carries cracked product to a separation system (not shown) which is conventional. An effluent line 16 from regenerator 12 vents flue gas containing a minor concentration of catalyst fines. "Dirty" hydrocarbon feed is introduced to reactor 10 through line 18 and spent catalyst is withdrawn through line 20 which connects with line 22 carrying regeneration fluid and catalyst into the regenerator 12. A portion of the spent catalyst is periodically or continuously discarded through line 24. Regenerated catalyst is withdrawn from regenerator 12 through line 26 which feeds into hydrocarbon feed line 18.

A second catalytic cracking unit comprises a reactor 30 and a regenerator 32 having effluent lines 34 and 36, respectively. Fresh or new makeup catalyst is introduced to regenerator 32 through line 38. Spent catalyst is withdrawn from reactor 30 and passed through line 40 to line 42 which feeds regeneration fluid together with entrained catalyst into regenerator 32. Regenerated catalyst is passed through line 44 into hydrocarbon feed line 46 leading into reactor 30.

A hydrocarbon-catalyst contacting chamber 50, which may also be termed an oil clean-up chamber, connects with a hydrocarbon feed source through line 52 and with a catalyst inlet line 54. Regenerated catalyst is fed from line 26 to line 54 through line 56 and, also, from line 44 to line 54 through connecting line 58. An auxiliary catalyst feed line 60 is provided as a supplemental source of used regenerated catalyst from other sources, such as other refineries or other catalytic cracking units.

Cleaned or treated hydrocarbon feed is passed from chamber 50 through line 62 into line 46 from which it flows to reactor 30. A steam line 64 may connect with line 62 for introducing steam with the feed when such practice is desirable. Used catalyst is passed from chamber 50 into slurry forming chamber 66 through line 68. "Dirtier" oil is introduced to chamber 66 through line 70 where it forms a slurry with the catalyst. The resulting slurry is passed through lines 72 and 74 into line 18 for passage to reactor 10. Steam may be introduced to the feed in line 18 through steam line 76 when desired.

The separate cracking units and the cracking conditions utilized in cracking such streams as topped crude and gas oil are conventional in the art and details of structure and operation will not be set forth for this reason. It is conventional practice to catalytically crack such feeds in both fluid-type catalytic cracking units and also in moving bed-type catalytic cracking units such as the so-called Thermofor T.C.C. and also Houdri-Flow catalytic cracking units. While the discussion and drawing illustrate fluid catalytic cracking, the invention is not limited thereto but is also applicable to moving bed processes in which the contacting is effected between the hydrocarbon feed to be cracked and the regeneration fluid (air or diluted air) and the catalyst in the form of a gravitating bed of catalyst particles.

In the process illustrated in the drawing a relatively "clean" oil, such as virgin gas oil, is passed through clean-up chamber 50 in contact with regenerated catalyst from both cracking units in order to remove contaminating materials such as metals and sulfur from the relatively "clean" feed. The contacting in chamber 50 must be effected at temperatures below cracking in order to avoid excessive coke and gas formation. It is preferred to contact the clean oil at a temperature in the range of 200 to 500 or 600° F. in chamber 50, which is well below incipient cracking. The removal of most of the contaminating metals from the "clean" oil feed greatly improves the quantity of the cracked product produced in reactor 30 and, also, lengthens the life of the catalyst used in the clean oil unit by depositing less contaminants thereon. By adding all of the makeup catalyst utilized in the two systems to regenerator 32 and by passing regenerated catalyst through lines 44, 58, and 54 to the oil clean-up chamber 50, the activity of the catalyst in the "clean" oil unit is maintained at a high level and there is less production of coke and gas with greater production of gasoline than is effected by conventional operation.

Catalyst is continually or periodically discarded from the "dirty" oil unit through line 24 and there is also a small loss of catalyst fines through lines 14, 16, 34, and 36. In the system shown and utilized, all of the new make-up catalyst passes into the clean oil unit and discarded catalyst is taken from the dirty oil unit with the exception of that which is lost as fines in the flue gas effluent and the cracked product effluent from the clean oil unit.

Topped crude fed to the "dirty" oil unit through line 70 is contacted both in reactor 10 and in chamber 50, with catalyst containing the metal contaminants deposited thereon. By maintaining less severe cracking conditions in reactor 10, good yields of gasoline are produced by this cracking reaction with contaminated catalyst.

Catalysts used in the process are conventional cracking catalysts which include natural catalysts of the active montmorillonite type clay (silica-alumina), synthetic silica-base catalysts such as silica-alumina, silica-magnesia, silica-zirconia, composites of varying proportions of silica, and alumina-base catalysts such as alumina-boria.

Typical operation of the process and apparatus is illustrated in the data set forth below.

*"Fluid"-type operation*

Reactor for clean oil unit:
   Pressure, p.s.i.g., _____ 10–25
   Temperature, °F., _____ 880–950
   Catalyst/oil wt. ratio, _____ 6:1 to 12:1
   Space velocity, #/hr./#, _____ 1.0 to 3.0
Oil charge, virgin gas oil
   API 60°/60° F., _____ 29.0
   Percent conversion, _____ 65–70
Regeneration for clean oil unit
   Pressure, p.s.i.g., _____ 10–25
   Temperature, °F., _____ 1025–1150
   Coke removal, percent of catalyst weight, _____ 1
Reactor for dirty oil unit:
   Pressure, p.s.i.g., _____ 10–20
   Temperature, °F., _____ 880–930
   Catalyst/oil wt. ratio, _____ 5:1 to 10:1
   Space velocity, #/hr./# _____ 1.0 to 3.0
Oil charge, topped crude
   API 60°/60° F., _____ 15
   Percent conversion _____ 40
Regenerator for dirty oil unit:
   Pressure, p.s.i.g., _____ 10–25
   Temperature, °F., _____ 1025–1150
   Coke removal, percent of catalyst weight, _____ 1
Oil clean up zone:
   Temperature, °F _____ 200 to 500
   Catalyst/oil wt. ratio _____ 0.5:1 to 2.5:1
   Original oil metal ($Ni$, V, Fe), p.p.m. __ 200
   Final oil metals (Ni, V, Fe), p.p.m. ___ 60

Certain modifications of the invention will become apparent to those skilled in the art and the illustrative details disclosed are not to be construed as imposing unnecessary limitations on the invention.

I claim:

1. A process for catalytically cracking a first feed stock containing catalyst-contaminating metals in a first cracking unit including a first reactor and a first regenerator and a second feed stock containing a lesser amount of contaminating metals in a second cracking unit including a second reactor and a second regenerator, there being a small catalyst loss and replacement in the two units amounting to a fraction of a percent of the amount circulated per day, which process comprises circulating catalyst from said first reactor to said first regenerator for regeneration and back to said first reactor in admixture with said first feed stock; circulating catalyst from said second reactor to said second regenerator for regeneration and back to said second reactor in admixture with said second feed stock; passing said second feed stock through a hot contacting zone maintained below cracking temperatures prior to admixing same with catalyst from said second regenerator to clean said second feed stock; passing a portion of the regenerated catalyst from said first regenerator into said hot contacting zone to remove contaminants from said second feed stock and provide cleaner conditions in said second unit; separating the catalyst from the cleaned second feed stock before passing said feed stock to said second reactor and mixing catalyst from said hot contacting zone with said first feed before passing same to said first reactor.

2. The process of claim 1 wherein a portion of the regenerated catalyst from the second regenerator is also passed to said hot contacting zone; deactivated catalyst is removed from said first unit and discarded; and new catalyst is supplied to said second unit to replace the catalyst lost from the two units.

3. The process of claim 2 wherein a slurry is formed of said first feed and catalyst from said contacting zone.

4. The process of claim 1 wherein said first feed stock comprises a topped crude, said second feed stock comprises a gas oil, and said catalyst comprises silica-alumina.

5. The process of claim 4 wherein said second feed is contacted with the catalyst in said hot contacting zone at a temperature in the range of 200 to 800° F.

6. Hydrocarbon cracking apparatus for cracking two different hydrocarbon feeds comprising in combination a first catalytic cracking unit including a first reactor having means for introducing a first hydrocarbon feed and a first regenerator with means for circulating used catalyst from said first reactor to said first regenerator and regenerated catalyst from said first regenerator to said first reactor; a second catalytic cracking unit including a second reactor having means for introducing a second hydrocarbon feed and a second regenerator with means for circulating used catalyst from said second reactor to said second regenerator and regenerated catalyst from said second regenerator to said second reactor; a catalyst-hydrocarbon contacting chamber having means for introducing catalyst from said first regenerator, means for introducing said second feed, and means for separating feed from catalyst therein; means for passing treated second feed from said chamber to said second reactor; and means for passing catalyst from said chamber to said first reactor.

7. The apparatus of claim 6 including means for withdrawing and discarding deactivated catalyst from said first unit; means for introducing new make-up catalyst to said second unit; and means for passing catalyst from said second regenerator to said contacting chamber.

8. The apparatus of claim 6 including a slurry forming chamber with means for passing catalyst thereto from said contacting chamber and means for passing said first hydrocarbon feed thereto prior to passing same to said first reactor.

9. The process of claim 1 wherein all deactivated catalyst to be discarded is removed from said first unit and all fresh make-up catalyst is added to said second unit, so as to improve clean operating conditions in said second unit.

10. A process for catalytically cracking a first feed stock containing catalyst-contaminating metals in a first cracking unit including a first reactor and a first regenerator and a second feed stock containing a lesser amount of contaminating metals in a second cracking unit including a second reactor and a second regenerator, there being a small catalyst loss and replacement in the two units amounting to a fraction of a percent of the amount circulated per day, which process comprises circulating catalyst from said first reactor to said first regenerator for regeneration and back to said first reactor in admixture with said first feed stock; circulating catalyst from said second reactor to said second regenerator for regeneration and back to said second reactor in admixture with said second feed stock; passing said second feed stock through a hot contacting zone maintained below cracking temperatures prior to admixing same with catalyst from said second regenerator to clean said second feed stock; contacting said second feed stock in said contacting zone with regenerated catalyst so as to remove contaminants from said second feed stock and provide cleaner feed to said second unit; and separating the catalyst from the cleaned second feed stock before passing same to said second reactor.

References Cited in the file of this patent

UNITED STATES PATENTS

| | | |
|---|---|---|
| 2,313,940 | Hirsch | Mar. 16, 1943 |
| 2,605,214 | Galstaun | July 29, 1952 |
| 2,614,068 | Healy et al. | Oct. 14, 1952 |